[19] United States Patent  
Sharpe et al.

[11] 4,207,194  
[45] Jun. 10, 1980

[54] CHEMICAL WASH WITH FLUID LOSS CONTROL

[75] Inventors: James R. Sharpe, Houston, Tex.; Dustin L. Free, Tulsa, Okla.

[73] Assignee: The Dow Chemical Company, Midland, Mich.

[21] Appl. No.: 913,787

[22] Filed: Jun. 8, 1978

Related U.S. Application Data

[62] Division of Ser. No. 807,718, Jun. 17, 1977, Pat. No. 4,127,174.

[51] Int. Cl.$^2$ .............................................. E21B 21/00
[52] U.S. Cl. ................................ 252/8.55 B; 166/291
[58] Field of Search ............... 166/291, 282, 311, 312; 252/8.55 B

[56] References Cited

U.S. PATENT DOCUMENTS

| | | | |
|---|---|---|---|
| 2,470,830 | 5/1949 | Monson | 252/8.55 |
| 3,411,580 | 11/1968 | McKinney et al. | 166/312 X |
| 3,467,193 | 9/1969 | Messenger | 166/292 |
| 3,820,602 | 6/1974 | Motley et al. | 166/291 |
| 3,827,498 | 8/1974 | Crowe | 166/282 |
| 3,884,302 | 5/1975 | Messenger | 166/291 |

OTHER PUBLICATIONS

Griffin et al., "The Proper Application of Cementing Spacers and Washes Can Improve Production of Oil and Gas," Proceedings of the 24th Annual Southwestern Petroleum Short Course, Texas Tech. Univ., Lubbock, Tex., Apr. 21–22, 1977, pp. 19–25.

Charles et al., The Use of Water Base Spacer with Thixotropic Cement Systems Improves Cement Jobs, Paper Distributed Apr. 29, 1977.

Form DWL 1451A–10M–1276, "Dowell's New Family of Spacers and Washes for Dowell Cementing Services", published Dec. 1976.

*Primary Examiner*—Herbert B. Guynn
*Attorney, Agent, or Firm*—D. H. Fifield

[57] ABSTRACT

Fluid loss control for aqueous chemical washes of the type used in well cementing is provided by incorporating in the wash, an effective amount of an oil-soluble resin mixture comprising a particulate friable resin and a particulate pliable resin.

5 Claims, No Drawings

CHEMICAL WASH WITH FLUID LOSS CONTROL

This is a division, of application Ser. No. 807,718 filed June 17, 1977, now U.S. Pat. No. 4,127,174 issued Nov. 28, 1978.

BACKGROUND OF THE INVENTION

A. Field of the Invention

The invention relates to a composition suitable for use as a chemical wash in well cementing procedures. It also relates to a method of using the chemical wash composition.

B. Description of the Prior Art

Rotary drilling techniques are commonly used for drilling wells into the earth. In the rotary drilling of a well, a drilling fluid or mud is circulated between the surface of the earth and the bottom of the well. Drilling muds which are commonly used include water based drilling muds, including both clay and polymer containing muds, oil based drilling muds, and emulsions. Drilling muds serve many useful purposes including the removal of earth cuttings from the well, control of formation pressures, and cooling and lubrication of the drill bit used in forming the well. However, there are also certain detrimental characteristics associated with drilling muds.

Among the problems associated with drilling muds, is that the liquid phase of a drilling mud tends to flow from the well into exposed permeable formations with the result that mud solids are filtered out on the wall of the well and a filter cake is formed thereon. Mud filter cakes are detrimental in the completion of wells in that they interfere with obtaining a good cement bond between the wall of the well and the conduit, or casing, positioned in the well. Also, drilling muds frequently contain components which are incompatible with fluids which one may desire to inject into a well containing a mud. For example, it has long been recognized that if certain cement slurries containing free polyvalent metal cations, especially calcium, are brought into contact with muds containing clay or certain polymers, a very viscous and detrimental plug can form in the vicinity of the mud-cement interface. High pressures required to move such a plug can rupture tubing, or make it necessary to stop pumping to avoid rupturing the tubing with the result that appreciable volumes of cement are left inside the tubing. Also, the high pressures can cause fracturing of the formation, thus causing loss of cement to the formation and formation damage. Another example of mud-cement incompatibility is that lignins, frequently used as dispersants in high density muds, can cause excessive retardation in cements if the cement becomes comingled with the mud.

For these reasons, various techniques have been developed for the removal of drilling muds from a borehole, particularly in the context of injecting a fluid into the borehole where said fluid is not compatible with the mud, and even more particularly, in the context of cementing. A common technique is to employ a "spacer" or "chemical wash". Although it is not always clear in the literature whether a particular fluid is a spacer or a chemical wash, a spacer is generally characterized as a thickened composition which functions primarily as a fluid piston in displacing the mud. Frequently, spacers contain appreciable quantities of weighting materials and also include fluid loss control agents. Chemical washes, on the other hand, are generally thin fluids which are effective principally as a result of turbulence, dilution, and surfactant action on the mud and mud filter cake. Chemical washes may contain some solids to act as an abrasive, but the solids content is generally significantly lower than in spacers because chemical washes are generally too thin to have good solids carrying capacity.

Chemical washes have also been employed to precondition air drilled boreholes in preparation for cementing.

Oil based chemical washes or spacers are disclosed in Means et al., U.S. Pat. Nos. 3,086,938; Messenger, 3,688,845; Hill et al., 3,749,173; and Motley et al., 3,820,602 and 3,849,316. Oil based chemical washes or spacers, however, generally do not perform well with water based muds.

Emulsion spacers or washes are disclosed in Parker, U.S. Pat. Nos. 3,625,286; Tuttle, 3,653,441; Carney, 3,850,248; and in Journal of Petroleum Technology, August, 1974, page 856. Webb, U.S. Pat. No. 3,532,168 teaches a micellar solution. Emulsions, however, do not lend themselves to easy preparation in the field.

Substantially water based fluids have also been proposed for use as spacers or chemical washes. A water buffer fluid is taught in *Neft. Khoz.*, v. 44, n. 12, p. 25–29 (Dec. 1966) (in Russian—English abstract at 1967 Petrol. Abstr. 80611). Williams, U.S. Pat. No. 2,848,051, employed a composition consisting essentially of insoluble inorganic materials in oil or in water. In U.S. Pat. No. 3,299,952, Savins teaches use of an aqueous solution of polyvinyl alcohol and borate ions. Wieland et al., U.S. Pat. No. 3,878,895, teaches an aqueous mixture of guar gum, a clay stabilizer such as an alkali metal chloride, calcium chloride, or zirconium oxide, a turbulence inducer such as the condensation product of mononaphthalene sulfonic acid and formaldehyde, an acid-soluble particulate such as powdered limestone, and polyethyleneimine. While some of these systems have found some measure of commercial success, most have suffered from at least one deficiency, such as compatibility with only a rather limited number of muds, a tendency to flocculate when used with certain cements, difficulty in mixing, susceptibility to bacterial degradation, difficulty in cleaning of equipment, and waste disposal problems. Accordingly, the industry has continued to search for new and improved spacer and wash compositions.

Other relevant art includes Messenger, U.S. Pat. No. 3,467,193, which taught use of an aqueous preflush containing a dispersant, which was followed by a spearhead of cement slurry containing a turbulence inducer, which was followed in turn by a densified cement slurry. Messenger, U.S. Pat. No. 3,884,302, used an aqueous alkaline flush having a pH of at least 10, which was followed by an aqueous fluid which formed a viscous film at the interface with the alkaline flush. Messenger, U.S. Pat. No. 3,348,612, further illustrates the state of the art. Crinkelmeyer, U.S. Pat. No. 3,605,897, teaches that glycols can be used to separate slugs of fluids. A surfactant is taught in *J. Jap. Ass. Petrol. Technol.* v. 35, No. 2, pp. 83–88, March 1970 (in Japanese;English abstract at *Petrol. Abstr.* v. 11, part 2, entry 143,459 (Apr. 17, 1971)). Various surfactant systems are reviewed at *Neft. Khoz.* No. 12, pp. 9–12, December, 1974 (in Russian; English abstract at *Petrol. Abstr.* v. 15, part 2, entry 204,636 (1975)).

Other chemical washes in commerical use include aqueous solutions of phosphates, alkaline earth metal lignosulfonates, ferrochrome lignosulfonates, tannins, fatty amides, fatty esters, alcohols, and the like, and various mixtures thereof. See "Spacers and Washes for Dowell Cementing Services", form DWL 1451-4M-674 published by The Dowell Division of The Dow Chemical Company. Caustic and acids are sometimes used ahead of cement, but for their pH or reactive properties, rather than as surfactants.

Although it is conventional to use fluid loss control agents in spacer compositions, it has heretofore not been possible to impart fluid loss control to chemical washes. Because of the relatively non-viscous nature of chemical washes, attempts to carry a sufficient load of conventional fluid loss control materials in the wash have been unsuccessful. Also, most fluid loss control materials are effective only when the fluid is at least somewhat viscous, yet increased viscosity generally results in a less effective chemical wash since an increase in viscosity results in a loss of turbulence in the borehole.

SUMMARY OF THE INVENTION

It has now been discovered that fluid loss control can be imparted to aqueous based, watery-thin chemical washes of the type containing at least one of (1) at least one surfactant to remove water based drilling muds from a borehole or (2) at least one surfactant to enhance the bonding of cement to the walls of a borehole or to the walls of a conduit placed in said borehole, by including in such chemical washes, an effective amount of a fluid loss additive of the type disclosed in U.S. Pat. No. 3,827,498 (and its divisionals, U.S. Pat. Nos. 3,891,566 and 3,898,167)—namely, an additive comprising a mixture of at least two oil soluble particulate resins, one of which remains hard and friable, and the other of which is soft and pliable (at the temperature to be encountered in the well) when dispersed in an aqueous medium. The discovery results in a new method of oil well cementing, comprising injecting a chemical wash containing an effective amount of said additive into the portion of a borehole to be cemented, thereafter emplacing a cement slurry into said borehole, and permitting said cement to set.

FURTHER DESCRIPTION OF THE INVENTION

The teachings of each patent and publication referred to herein are expressly incorporated herein.

Among the advantages of the present invention are the fact that fluid loss control can now be effectively imparted to chemical washes without significantly increasing the viscosity thereof, thereby permitting more efficient deployment of the surfactant or surfactants employed in the wash without detrimentally affecting the turbulent flow properties of the wash. Fluid can be more efficiently displaced through the casing annulus because less fluid is lost to the formation. Also, fluid loss control is obtained with an extremely thin filter cake which results in virtually no constriction of the annular space between the casing and the wall of the borehole, so that cement slurries can frequently be injected with lower pressures at the well head. Moreover, in contrast to mud filter cakes, the extremely thin barrier resulting from the present invention does not appear to hinder bonding of the cement to the borehole wall. Another advantage is that the need for fluid loss additives in cement slurries employed subsequent to the chemical wash of the present invention is reduced. Also, the chemical wash of the present invention is effective in rendering air drilled boreholes water wet, thereby enhancing cementing operations in air drilled boreholes as well as in mud drilled boreholes. The wash of the present invention is also effectively employed as a preflush in restorative work such as squeeze cementing.

The chemical wash of the present invention is generally suitable for use with water based muds or oil-in-water emulsion muds. As those skilled in the art will recognize, however, any particular wash may be more effective with one type of mud—such as a bentonite mud, phosphate mud, a calcium mud, or a salt water mud—than other washes embraced within the scope of the present invention, depending on the particular surfactant or surfactants employed in the wash. For example, it is known that ferrochrome lignosulfonate washes are frequently used for gypsum based muds, whereas washes containing calcium lignosulfonate are frequently used with bentonite based muds. The surfactant component is generally employed in amounts of from about 0.5 to about 10 pounds per barrel of water (about 0.15–3 weight percent).

A wash which has had particular commercial success in recent years is an aqueous solution containing as the active surfactant component, a water soluble reaction product of at least one of tri- or dialkanolamine, or mixtures thereof, with at least one fatty acid. See generally, Kirk-Othmar *Encyclopedia of Chemical Technology*, 2 Ed., Vol. 1, pp. 810–824, "Alkanolamines" for such reaction products. While a single amine and a single fatty acid, such as capric, lauric, mysteric, palmitic, stearic, or oleic acid may be employed, it is most economical to employ the reaction product of for example, a crude triethanolamine and a mixture of fatty acids, such as coconut oil or tall oil. The reaction product may be provided in an alcohol solution, which solution may be added to water in an amount sufficient to provide in the chemical wash, an effective amount of the reaction product, e.g., from about 0.15 to about 1.5 weight percent. Such a chemical wash is highly effective with a wide variety of muds.

From the teachings of this disclosure in view of those in U.S. Pat. No. 3,827,498, those skilled in the art will be able to prepare suitable resin mixtures for use herein.

As taught in said patent, the resins provide effective fluid loss control at concentrations of at least about 2 pounds (total weight of both resins) per 1000 gallons of fluid, i.e., at a total concentration in the wash of the present invention of at least about 0.025 weight percent. Preferably, the wash contains from about 0.02 to about 0.4 weight percent pliable resin and from about 0.02 to about 0.5 weight percent pliable resin. Little additional fluid loss control is realized at higher concentrations.

In the best mode contemplated for carrying out this invention, from about 0.5 to about 2 parts by volume of a resin formulation, hereinafter described, is mixed with from about 2 to about 8 parts by volume of a surfactant formulation, hereinafter described, and about 164 parts by volume water (i.e., about 0.5–2 quarts resin formulation and 0.5–2 gallons surfactant formulation per barrel of chemical wash), to provide a wash containing by weight, about 0.15–0.6% active surfactant; about 0.04–0.2% pliable resin; and about 0.05–0.27% friable resin.

The resin formulation employed in the best mode is comprised, by weight; (1) of from about 25–40 percent a pliable resin dispersion such as Elvax D1112 brand ethylene/vinyl acetate copolymer dispersion in water (50% solids) or Picconol A102 brand 50 percent thermoplastic aliphatic hydrocarbon resin dispersion in water; (2) from about 15–25 percent a friable resin such as Piccomer 150 brand alkyl aromatic hydrocarbon resin; (3) from about 25-40 percent water or a water soluble solvent as a carrier, e.g., glycerin, aqueous ammonium chloride, and the like; (4) about 3 percent a silicone type antifoaming agent; and from about 5-20 percent an anticoagulant for the pliable resin, such as an adduct of di-sec-butylphenol with ethylene oxide, cocobetaine, and the like.

The surfactant formulation employed in the best mode comprises, by volume, about 4 parts water and about 1 part n-propyl or isopropyl alcohol containing from about 50-75 weight percent a reaction product of triethanolamine with a mixture of fatty acids.

If desired, the chemical wash may contain small amounts of other functional additives which do not affect its performance, e.g., a dye aids in recognition of wash returned from the borehole.

In practicing the invention, a sufficient amount of chemical wash is injected in a borehole to be cemented in advance of the cement slurry, to adequately thin the mud so that substantially no viscous plug is formed along the leading edge of the cement. As those skilled in the art will realize, use of greater amounts of chemical wash, within reason, results in a cleaner borehole, and consequently better cement jobs. Generally, from about 5 to about 30 barrels of wash is satisfactory, though the actual amount employed will vary depending on the volume of the annulus, the effectiveness of a particular surfactant with a particular mud, and the like. Smaller volumes of the chemical wash of the present invention are required, however, than an otherwise identical wash containing none of the resin fluid loss material, since the volume of wash lost to the formation will be minimal.

EXAMPLES

The following examples further illustrate the present invention and its advantages over the prior art. Except as otherwise noted, the cement slurry employed in the examples was a thixotropic cement of the type described in U.S. Pat. No. 3,563,313, containing Class A cement and, by weight of cement, 12 percent calcium sulfate hemihydrate, 3 percent calcium chloride flake (assay 77-80 weight percent $CaCl_2$), and 60 percent water. The Base Chemical Wash (BCW) comprised 1 part by volume surfactant blend per 41 parts by volume water. The surfactant blend component of the base chemical wash comprised 4 parts by volume water, and 1 part by volume a 64 weight percent solution of the reaction product of a blend of fatty acids and crude triethanolamine in isopropanol, i.e., the BCW contained about 0.3 weight percent of the fatty acid-amine reaction product on an active basis.

LABORATORY TESTS

Fluid loss tests were carried out at 75°-85° F. at 1000 psi according to the procedure described in API Bulletin RP10B, Section 8, (19th Edition, January, 1974) except that 1"×1" cylindrical Berea sandstone cores were used in lieu of the standard screens. Cores were used rather than screens because in relieving pressure on the cell to remove excess wash material and charge the cell with cement slurry, screens would flex as a result of pressure change and cracks in the filter cake would occur. Original permeability of each test core to water was determined. The test chamber was filled (about 70-75 ml) with the material to be tested as a chemical wash and fluid loss measurements were conducted for 30 minutes or until about 50 ml of fluid had passed through the core, whichever occurred first. Pressure was then relieved, the chamber opened, and any excess fluid was poured from the chamber. The walls of the chamber were rinsed with water, care being taken to assure the core was not contacted by the rinse. The chamber was then filled with the thixotropic cement slurry, and 1000 psi pressure reapplied. Fluid loss tests with the cement were carried out for 30 minutes or until air blow out (designated "BO" in the table which follows). Test results are shown in Table I.

TABLE I

| Run | Original[1] Permeability md | Wash Material | Wash Fluid Loss | | | Cement Fluid Loss | | |
|---|---|---|---|---|---|---|---|---|
| | | | Volume ml | Time min. | API Fluid Loss ml/30 min[2] | Volume ml | Time min. | API Fluid Loss ml/30 min[2] |
| Comparison 1 | 85.5 | Water | 45 | 0.067 (4 sec) | 8590 | 28 | 0.183 (BO@11 sec) | 3323 |
| Comparison 2 | 69.2 | BCW[3,4] | 41 | 0.075 (4.5 sec) | 7370 | 32 | 0.217 (BO@13 sec) | 3384 |
| Comparison 3 | 99.3 | BCW + 3% bentonite[5] | 18 | 30 | 162 | 15.5 | 30 | 140 |
| Comparison 4 | 79.1 | 1 wt % silica flour added to BCW[6] | 50 | 0.17 (10.2 sec) | 5970 | 25 | 0.233 (14 sec) | 2551 |
| Comparison 5 | 67.8 | 2 wt % bentonite added to BCW[7] | 38 | 30 | 342 | 17[8] | 0.467[8] (28 sec) | 1225[8] |
| Comparison 6 | 61.3 | BCW + 1% HEC[9] | 30 | 7.5 | 539 | 18 | 0.967 (58 sec) | 917 |
| Comparison 7 | 29.9 | BCW + 2% bentonite[10] | 24 | 30 | 216 | 28 | 14 | 368 |
| Example 1 | 36.6 | BCW + Resin A[11] | 13 | 30 | 117 | 17 | 30 | 153 |
| Example 2 | 83.0 | BCW + Resin A[11] | 10 | 30 | 90 | 12.5 | BO@16[12] | 154 |
| Example 3 | 82.3 | BCW + Resin B[13] | 12.5 | 30 | 113 | 18 | 30 | 162 |

TABLE I-continued

| Run | Original[1] Permeability md | Wash Material | Wash Fluid Loss | | | Cement Fluid Loss | | |
|---|---|---|---|---|---|---|---|---|
| | | | Volume ml | Time min. | API Fluid Loss ml/30 min[2] | Volume ml | Time min. | API Fluid Loss ml/30 min[2] |
| Example 4 | 73.0 | BCW + Resin B[13] | 12 | 30 | 108 | 13 | 19 | 147 |

Notes:
[1]For 1000 psi and 1-inch core, $Kmd = \frac{ml\ fluid}{min} \times \frac{2.54 \times 49.91}{1000} = 0.1268 \times \frac{(ml\ fluid)}{(min)}$, or $7.606 \times \frac{(ml\ fluid)}{(sec)}$
[2]API RB10B Formula 8.1 times a factor of 9—area of core 1/9 that of standard screen.
[3]Basic chemical wash—see text immediately preceding Table.
[4]Cement used was from same batch as Comparison Run 1. Run 2 made about 12 minutes after Run 1, but slurry was reagitated slightly immediately prior to Run 2. All other cement slurries fresh.
[5]3 weight percent bentonite slurry prepared in water, aged 90 minutes, and then 1 part by volume of the surfactant blend was added to 41 parts by volume of the slurry.
[6]Silica flour did not suspend well.
[7]BCW prepared, to which was added 2 wt % bentonite. Bentonite slurry was aged 90 minutes prior to testing.
[8]Part of filter cake may have been rinsed off prior to adding cement slurry to the test chamber. These results are of questionable validity.
[9]1 wt % hydroxyethylcellulose admixed in water. After 10 minutes, 1 part by volume of the surfactant blend was added to 41 parts by volume of the HEC solution.
[10]Same as note 5 except 2% bentonite, and slurry not permitted to age.
[11]To 168 parts by volume of BCW was added 1 part by volume of a dispersion containing, by weight, about 30.8% Picconol A102 resin dispersion (50% solids), 17.6% Piccomer 150 brand resin, 24% water, 9.9% ammonium chloride, 0.3% antifoaming agent, 4.7% an adduct of di-sec-butyphenol plus 10 moles ethylene oxide, 11.4% cocobetaine, 1.4% isopropanol, neutralized to a basic pH. (By weight, about 0.96% pliable resin (solids) and 0.11% friable resin in the wash.)
[12]Air channel down side of cement slurry.
[13]Same as note 11 except friable resin component had slightly larger particle size, and comprised 21.4% of the added resin dispersion instead of 17.6% of finer resin, with substantially proportionate adjustment in the other components. (By weight, about 0.92% pliable resin (solids) and 0.13 friable resin in the wash.)

From the foregoing data, it can be seen that the fluids of the present invention each containing only about 0.095 percent pliable resin and about 0.12 percent of the friable resin, i.e., a total of about 0.21 percent fluid loss agent, performed far better than the other fluid loss additives tested, with the possible exception of the bentonite solution containing more than ten times as much fluid loss additive, i.e., the 3% bentonite test of Comparison Run 3. Additionally, the present composition can be used immediately, without waiting for a material to hydrate.

FIELD DATA

Improved cement jobs have resulted in the San Juan Basin near the four corners area of New Mexico, Colorado, Arizona, and Utah when the wash of the present invention has been employed. Wells in this region are frequently drilled through the productive zone using gas. Conventional cementing procedure in the region had called for a pre-flush of 30 barrels of water containing 300 pounds of bentonite ahead of the cement. Almost without exception, extremely high treating pressures were encountered, formations were broken down, and even though large excesses of cement were pumped, seldom was cement reversed out. Frequently, the plug was not even bumped, due to pressure limitations. The reason or reasons for these pressure build-ups is not fully understood. Possible explanations may be partial dehydration of the bentonite pre-flush causing increasing viscosity, incompatibility with the cement, or bridging caused by a buildup of cuttings picked up by the leading edge of the pre-flush.

In any event, the use of the low fluid loss wash of the present invention in place of the customary bentonite pre-flush avoids or at least significantly reduces these problems. Where treatment pressures in the range of 2000–2500 psi were frequently encountered in the past, pressures in the range of 100–1000 are more typical when employing the wash of the present invention.

A representative treatment is that done on a well in San Juan County, New Mexico for a major oil company, wherein a 4½" liner extending from a depth of 2660 feet to total depth at 5200 feet was cemented in place. The well was previously equipped with 7-inch casing to a depth of 2875 feet, and 6¼-inch open hole, which had been air drilled, extended to a depth of 5200 feet.

About 20 barrels of a chemical wash substantially identical to that of Examples 1 and 2 was injected down the liner, which was hung on drill pipe, and up into the annulus. A cement slurry comprised of a 50/50 volume mixture of Class B cement and pozzolan plus conventional additives was injected down the liner and into the annulus. The plug was dropped on the fly and the cement and wash ahead of it were displaced. The plug reached the shoe at a mere 200 psi, whereupon pressure was briefly increased to 1600 psi. The annulus above the liner was then filled with displacement fluid, and substantially all of the chemical wash previously injected, but no cement, was reversed out indicating (1) very little chemical wash had been lost to the formation and (2) the cement had filled the annulus over substantially the entire length of the liner as planned.

The well operator indicated that in eight previous attempts to cement other of its wells in the same region, without the wash of the present invention, the plug had not been bumped without excessive pressures causing breakdown of the formation.

What is claimed is:

1. A watery-thin chemical wash composition suitable for use as a pre-flush to cement in well cementing operations, said wash containing water and as an active surfactant component a water soluble reaction product of at least one of tri- or dialkanolamine, or mixture thereof, with at least one fatty acid and dispersed in said wash a heterogeneous mixture of distinct particles comprising both a first particulate oil soluble resin which is friable and a second particulate oil soluble resin which is pliable, wherein the size of said friable particles ranges from about 0.5 to about 300 microns and the size of said pliable resin particles ranges from about 0.05 to about 30 microns, in amounts effective to impart fluid loss control to said wash.

2. The chemical wash of claim 1 wherein the friable and pliable resin are present in a weight ratio to one another of about 1:20 to about 20:1, wherein together they comprise at least 0.025 weight percent of the chemical wash, and wherein the active surfactant comprises from about 0.15–3 weight percent of the wash.

3. The chemical wash of claim 2 comprising, by weight, about 0.15–1.5% active surfactant component;

about 0.02–0.4% pliable resin; and about 0.02–0.5% friable resin.

4. The chemical wash of claim 3 wherein the active surfactant comprises the reaction product of crude triethanolamine and tall oil, and wherein the chemical wash comprises, by weight, about 0.15–0.6% said reaction product; about 0.04–0.2% pliable resin, and about 0.05–0.27% friable resin.

5. The chemical wash of claim 4 comprising, by weight; about 0.3% said reaction product, about 0.95% said pliable resin, and about 0.12% said friable resin.

* * * * *